United States Patent [19]

Baron et al.

[11] 4,033,730
[45] July 5, 1977

[54] PROCESS AND APPARATUS FOR FEEDING PARTICULATE SOLIDS INTO A PRESSURE REACTOR

[75] Inventors: Gerhard Baron, Hofheim; Carl Hafke, Frankfurt am Main; Dietrich Engler, Hofheim; Rainer Reimert, Oberhochstadt; Eberhard Blaum, Frankfurt am Main, all of Germany

[73] Assignee: Metallgesellschaft Aktiengesellschaft, Frankfurt am Main, Germany

[22] Filed: June 4, 1976

[21] Appl. No.: 693,043

[30] Foreign Application Priority Data

Feb. 5, 1976  Germany .......................... 2604383

[52] U.S. Cl. ........................... 48/86 R; 48/77; 48/197 R; 48/DIG. 4; 110/108; 202/251; 202/262; 214/35 R; 222/409

[51] Int. Cl.² ......................................... C10J 3/30

[58] Field of Search ............... 48/86 R, 76, 87, 77, 48/210, 197 R, DIG. 4; 214/17 B, 35 R; 222/194, 195, 409; 302/53, 59; 110/108; 202/251, 262

[56] References Cited

UNITED STATES PATENTS

| | | | |
|---|---|---|---|
| 809,754 | 1/1906 | Shackleford | 48/86 R |
| 989,661 | 4/1911 | Sundstrom | 48/86 R |
| 2,925,334 | 2/1960 | Henze et al. | 48/86 R |

Primary Examiner—Robert L. Lindsay, Jr.
Assistant Examiner—George C. Yeung
Attorney, Agent, or Firm—Burgess, Dinklage & Sprung

[57] ABSTRACT

Particulate solids are fed into a pressure reactor operated under a pressure of 5–150 bars by means of a guide cylinder which is secured to the reactor and surrounds the reactor inlet. The guide cylinder is adapted to be closed and a stationary feed conduit is directed towards the guide cylinder. A cylinder container, which is gastightly guided in the guide cylinder and has a bottom which is adapted to be closed, is moved up and down in the guide cylinder and when the bottom of the cylinder is open and the reactor inlet is closed the material flows out of the container into the guide cylinder whereas the bottom of the container is closed and the same is moved toward the open reactor inlet to displace gases into the reactor. The device for carrying out the process includes a guide cylinder secured to the reactor and surrounding the reactor inlet. The guide cylinder is adapted to be closed. A stationary feed conduit is directed towards the guide cylinder and a container is gastightly guided in the guide cylinder and is movable up and down therein and has a bottom that is adapted to be closed.

10 Claims, 2 Drawing Figures

PROCESS AND APPARATUS FOR FEEDING PARTICULATE SOLIDS INTO A PRESSURE REACTOR

BACKGROUND

This invention relates to a process of feeding particulate solids into a pressure reactor operated under a pressure of 5-150 bars, by means of a guide cylinder which is secured to the reactor and surrounds a reactor inlet, which is adapted to be closed, and a stationary feed conduit directed toward the guide cylinder, and relates also to a feeder for carrying out said process. The particle size of the solids may vary wide limits from dust particles to lumps. The specific field of application of the invention is the feeding of particulate coal into a pressure gasification reactor, although the invention is not restricted thereto.

Known feeders for pressure reactors consist either of stationary lock containers, which are adapted to be filled and emptied, or of rotary star feeders, such as are apparent, e.g., from U.S. Pat. Nos. 1,412,118 and 1,814,787. These devices are satisfactory in operation, e.g., when used in conjunction with the gasification of coal under approximately atmospheric pressure. In a gasification process carried out under superatmospheric pressure, however, product gas from the gasification process enters the emptied volume of the feeder. This represents an undesired and disturbing loss. This product gas loss increases with an increase of the gasification pressure.

SUMMARY

The invention provides a feeding process which is of the kind defined first hereinbefore and which can easily be carried out and controlled and in which a loss of disturbingly large quantities of product gas as the solids are charged into the reactor is prevented. This is accomplished according to the invention in that a cylindrical container, which is gastightly guided in the guide cylinder and has a bottom which is adapted to be closed, is moved up and down in the guide cylinder and when the bottom of said container is open and the reactor inlet is closed the material flows out of said container into the guide cylinder whereas the bottom of the container is closed when the same is moved toward the open reactor inlet to displace gases into the reactor.

Solids are suitably fed into the cylindrical container when the bottom thereof is closed and the bottom valve of the container is subsequently opened when the gas volume in the guide cylinder has been pressure-relieved approximately to atmospheric pressure.

DESCRIPTION OF THE DRAWING

An illustrative embodiment of the feeder which embodies the invention and can be used to carry out the process will be explained with reference to the drawing. This embodiment is used for feeding particulate coal into a pressure gasification reactor, although the invention is not restricted thereto.

DESCRIPTION

Figure 1:
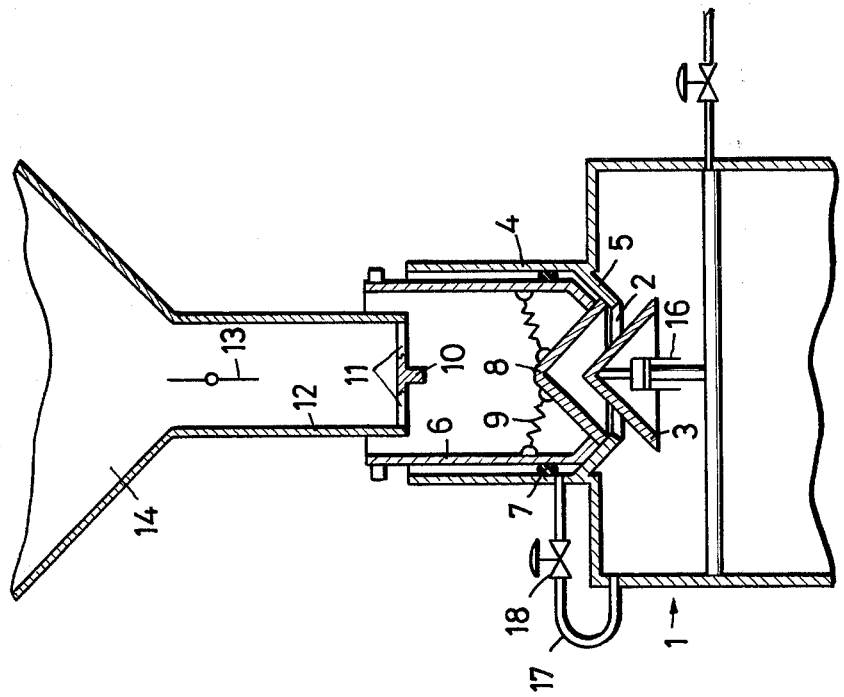
FIG. 1 is a vertical sectional view showing the feeder with the cylindrical container open.
Figure 2:
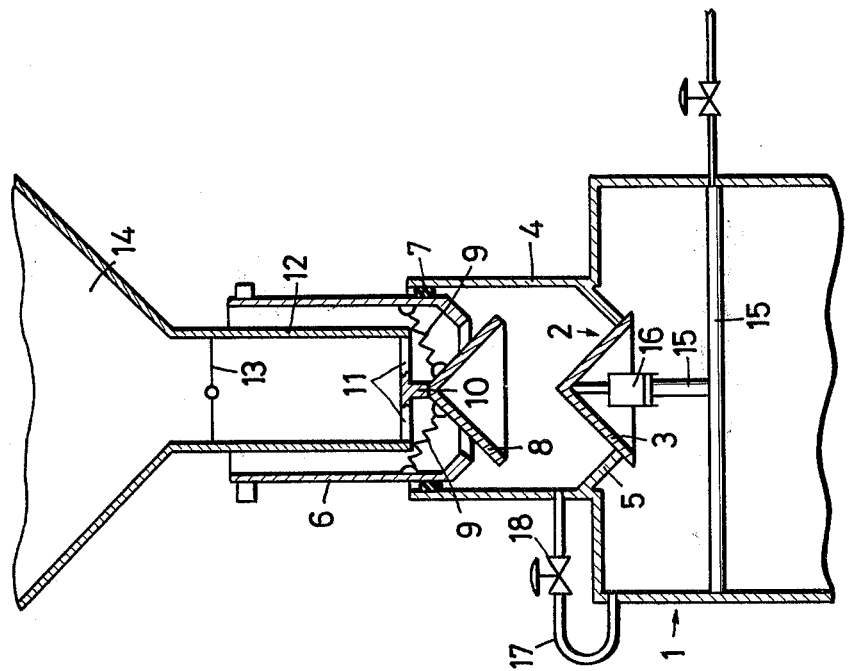
FIG. 2 shows the feeder of FIG. 1 with the reactor inlet open.

FIGS. 1 and 2 show only the uppermost part of a reactor 1, which serves to gasify dust coal of fine-grained coal under a pressure of 5 to 150 bars. The coal is gasified in known manner by a treatment with gasifying agents, such as oxygen and water vapor or possibly carbon dioxide. The feed inlet 2 of the reactor is adapted to be closed by a movable valve 3. The valve 3 is shown in its closed position in FIG. 1 and in its open position in FIG. 2.

A guide cylinder 4 is firmly connected to the reactor 1 and has its lower end a conical extension 5. The cylinder 4 surrounds a cylindrical container 6, which can be moved up and down by drive means, not shown. A sealing element is provided between the outside of the container and the inside of the cylinder 4. In the embodiment shown, this sealing element is joined to the container 6. Alternatively, the sealing element 7 could be joined to the inside surface of the cylinder 4. The sealing element prevents an escape of gases between the cylinder 4 and the container 6.

The bottom of the container 6 is adapted to be closed by a hollow conical valve member 8, which is urged by tension springs 9 to its closed position, shown in FIG. 2. The valve members 3 and 8 are so shaped that they can fit one into the other in their closed positions without a large gap.

In FIG. 1, the valve 8 is shown in an open position, in which it abuts a stationary stop 10. The stop 10 is secured by two struts 11 to the coal feed pipe 12, which is also stationary. The coal feed pipe 12 contains a metering valve, which is shown on the drawing as a butterfly valve 13. A supply of dust coal or fine-grained coal is disposed in the supply hopper 14 above the metering valve.

The feeder according to the invention may be used for coal within a large particle size range, provided that the coal is flowable in the feeder.

The valve member 3 is hydraulically or pneumatically actuated by means of a pressure conduit 15 and a pressure-fluid actuator 16. Alternatively, the valve member 3 may be actuated by a linkage from the outside. A pressure-equalizing conduit 17 provided with a shut-off valve serves for an equalization of pressure between the interior of the reactor 1 and the interior of the cylinder 4. The conduit 17 may be connected to the upper portion of the reactor 1, as is shown on the drawing, or may extend from a separate pressure vessel.

The feeder operates as follows: In the condition shown in FIG. 1, a defined quantity of particulate coal flows out of the container 6 past the open valve member 8 into the interior of the cylinder 4 while the valves 3 and 18 are closed. Then the container 6 has been emptied, it is moved downwardly toward the inlet of the reactor. After a short downward movement of the container 6, its bottom is closed because the tensile springs 9 hold the valve member 8 in its closed position unless it is engaged by the stationary stop 10. As long as the bottom of the container 6 is closed, coal from the supply hopper 14 can flow into the container past the open valve 13.

When the bottom of the container 6 is closed, the gas in the cylinder 4 is compressed by the container 6 as it moves toward the valve 3. By means of the container 6 alone, the gas can be compressed to such a degree that the pressure in the cylinder 4 is approximately as high as the pressure in the reactor 1. A pressure-equalizing conduit 17 may be omitted in that case. If the pressure equalization is not to be effected by the container 6 alone, the pressure equalization is finally effected by means of the conduit 17 and the open valve 18. When the pressure equalization has been effected, the valve member 3 at the reactor inlet is opened so that coal can flow into the reactor. In this phase the container 6 descends until it engages the conical extension 5, as is shown in FIG. 2. The valve member 3 is now closed so that only negligibly small quantities of gas remain in the spaces between the container 6 and the closed reactor.

From a comparison of FIGS. 1 and 2 is is apparent that the sealing element 7 is not moved across conduit openings during any part of the movement of the container 6. The edges at such conduit openings might damage the sealing element. For this reason the feeder according to the invention ensures a long life of the seal 7.

When the reactor 1 is closed and the container 6 has been re-filled with coal flowing past the open butterfly valve 13, the container is raised so that the gas volume between the container and the reactor is pressure-relieved. The stroke length of the container 6 may be so selected that the pressure in the cylinder 4 is approximately atmospheric when the bottom of the container 6 has been raised to such an extent that the stationary stop 10 causes the valve member 8 to open. This position, in which the bottom of the container 6 is open, is shown in FIG. 1. Because a pressure relief has been effected before, an escape of gas from the interior of the cylinder 4 past the open valve member 8 to the outside can be avoided. The mode of operation can be modified in that coal is not filled into the container 6 until the same is in its upper position.

What is claimed is:

1. Feeder for feeding particulate coal into a coal gasification reactor having a reactor inlet, the feeder comprising: a guide cylinder fixed to the reactor and surrounding the reactor inlet, a first movable valve member, means mounting the first movable valve member to controllably open and close the reactor inlet, a cylindrical container having an outlet in the bottom thereof and gas-tightly mounted for longitudinal movement in the guide cylinder, a stationary feed conduit directed towards the container, means for controllably moving the container between a first position wherein the outlet is adjacent said reactor inlet and a second position wherein the outlet is spaced apart from the reactor inlet, a second movable valve member for opening and closing the container outlet and a first means coactive with said second valve member and responsive to the movement of the container from the first position towards the second position for effecting opening of the outlet and a second means responsive to the movement of the container from the second position towards the first position for effecting closing of the outlet.

2. Feeder of claim 1 wherein the second means responsive to the movement for closing the outlet of the container comprises springs means.

3. Feeder of claim 1 wherein the first means responsive to the movement for opening the outlet of the container means comprises stationary stop means.

4. Feeder of claim 3 wherein the stationary stop means is secured to the feed conduit.

5. Feeder of claim 1 wherein further comprising actuatable pressure-equalizing conduit means connected to the interior of the guide cylinder.

6. Feeder of claim 1 wherein the feed conduit includes metering means.

7. Process for feeding particulate coal into a coal gasification reactor operated under a pressure of 5–150 bars and comprising a reactor inlet, a guide cylinder which is secured to the reactor and surrounds the reactor inlet, a first movable valve member for opening and closing the reactor inlet, a cylindrical container gas-tightly guided in the guide cylinder and having an outlet in the bottom thereof, a stationary feed conduit for feeding coal into said container, and a second movable valve member responsive to the moving of the container into a first position adjacent the reactor inlet for closing the container outlet and responsive to the moving of the container into a second position spaced apart from the reactor inlet for opening the container outlet, wherein the process comprises:

feeding particulate coal into the container when same is in the first position, moving said container with its closed outlet from the first position adjacent the reactor inlet, and maintaining said inlet closed, to the second position removed from said reactor inlet thereby opening the outlet of said container and feeding a portion of said particulate coal from said container into said guide cylinder surrounding the closed reactor inlet, moving the container into the first position thereby closing the outlet of said container, opening the reactor inlet to feed said portion of particulate coal into the reactor and to push gases out of the guide cylinder into the reactor as the container is moved into the first position adjacent the reactor inlet, and closing the reactor inlet when the container is in its first position.

8. Process of claim 7 wherein the cylindrical container is moved from the first to second positions when the gas volume in the guide cylinder has been pressure-relieved approximately to atmospheric pressure.

9. Process of claim 7 further comprising raising the pressure in the guide cylinder approximately to the operating pressure immediately after the closing of the outlet of the cylindrical container and before the reactor inlet is opened.

10. Process of claim 9 wherein the pressure in the guide cylinder is raised at least in part by an admission of gas.

* * * * *